United States Patent

[11] 3,603,176

[72] Inventors Roderick G. Tipping;
William V. Phillips, both of Indianapolis, Ind.
[21] Appl. No. 865,240
[22] Filed Oct. 10, 1969
[45] Patented Sept. 7, 1971
[73] Assignee General Motors Corporation
Detroit, Mich.

[54] TRANSMISSION
4 Claims, 1 Drawing Fig.

[52] U.S. Cl. ................................................. 74/687, 74/720.5
[51] Int. Cl. .................................................F16h 47/04, F16h 37/06
[50] Field of Search ........................................ 74/687, 720.5

[56] References Cited
UNITED STATES PATENTS

| | | | |
|---|---|---|---|
| 3,383,953 | 5/1968 | Christenson ................. | 74/720.5 |
| 3,433,095 | 3/1969 | Tuck ............................ | 74/687 |
| 3,470,769 | 10/1969 | Livezey ....................... | 74/687 |
| 3,492,891 | 2/1970 | Livezey ....................... | 74/720.5 |

Primary Examiner—Carlton R. Croyle
Assistant Examiner—Thomas C. Perry
Attorneys—W. E. Finken, A. M. Heiter and R. L. Phillips ABSTRACT: A transmission having speed differential gearing driven by an input powered variable speed ratio range unit to effect driving of two outputs at the same speed for straight vehicle drive and additional speed differential gearing driven by an input-powered variable speed ratio hydrostatic drive unit to effect a speed differential bias on the first-mentioned speed differential gearing to effect a speed differential between the two outputs for vehicle steering.

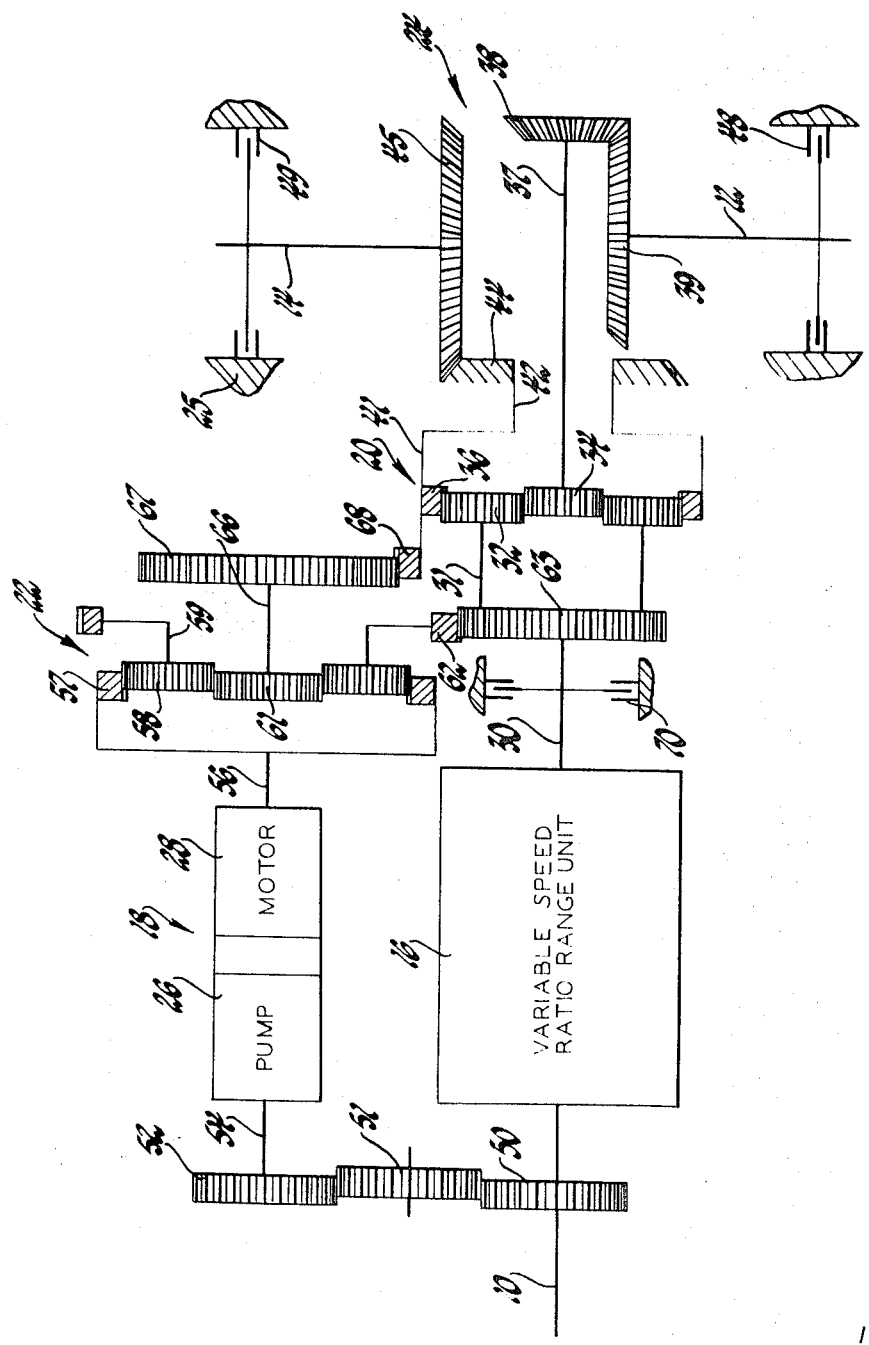

TRANSMISSION

This invention relates to vehicle transmissions and more particularly to vehicle transmissions providing straight vehicle drive and also providing vehicle steering by driving.

The transmission according to the present invention provides both vehicle propulsion drive and vehicle steering by driving in both forward and reverse. Propulsion drive for straight vehicle motion is by a variable speed ratio range unit which is input driven and provides drive in both forward and reverse. Planetary gearing provides for separate drives from the range unit to the transmission's two output shafts. These drives to the output shafts are via bevel gear drives whose ratios are inversely proportional to the unequal drives from the planetary gearing so that the output shafts are driven at the same speed to provide straight vehicle drive.

Steering is provided by additional planetary gearing which is driven by an input powered variable speed ratio hydrostatic drive unit. By control of the hydrostatic drive unit, this planetary gearing effects a speed differential bias on the first-mentioned planetary gearing which in turn effects a speed differential bias on the output shafts to provide steering. The propulsion drive planetary gearing and steer drive planetary gearing are drivingly connected so that the output speed of the hydrostatic drive unit is zero during straight vehicle drive.

An object of the present invention is to provide a new and improved dual output transmission.

Another object is to provide in a dual output transmission an input powered variable speed ratio range unit cooperating with speed differential gearing to provide equal speed ratio drives to two outputs and an input powered variable speed ratio hydrostatic drive unit cooperating with additional speed differential gearing to effect bias on the first mentioned speed differential gearing to effect a speed differential between the output shafts to provide steering.

Another object is to provide a dual output transmission providing drives of equal speed ratio to two outputs for straight vehicle drive via planetary gearing and with this planetary gearing operating on additional planetary gearing to establish the output of an input-powered hydrostatic drive unit at zero speed and with the hydrostatic drive unit operable to vary its output speed to effect by operation of all the planetary gearing a variable speed differential between the two transmission outputs for vehicle steering.

These and other objects of the invention will be more apparent from the following description and drawing of the preferred embodiment of the invention.

The drawing diagrammatically shows the preferred embodiment of the transmission according to the present invention.

The transmission according to the present invention has dual output and provides propulsion or straight vehicle drive and steering by driving in both forward and reverse. Referring to the drawing, the preferred embodiment of the transmission is shown as being adapted to drivingly connect a track-laying vehicle's engine to the vehicle's two tracks, the transmission receiving power from the vehicle's engine via an input shaft 10 and delivering power to the vehicle's two tracks via output shafts 12 and 14. Between the input and two outputs, the transmission generally comprises a variable speed ratio range unit 16, a variable speed ratio hydrostatic drive unit 18, propulsion drive planetary gearing 20, steer drive planetary gearing 22 and a bevel gear drive arrangement 24. All of these components are suitably supported in a housing generally designated as 25. The variable speed ratio range unit 16 may be of any suitable conventional type such as the hydrodynamic torque converter-planetary range gearing transmission in U.S. Pat. No. 3,267,769, to Tuck et al., the Tuck et al. transmission providing seven forward drive ratios and one reverse drive ratio. The variable speed ratio hydrostatic drive unit 18 may also be of any suitable conventional type with the pump 26 of this unit having variable displacement and the motor 28 of this unit having fixed displacement, the speed and direction of the motor output being controlled by the hydrostatic drive unit's displacement control mechanism which may also be conventional.

Describing the propulsion or straight vehicle drive portion of the transmission arrangement, the transmission input shaft 10 is connected to deliver engine power to the variable speed ratio range unit 16 which, through its drives, transmits power to a shaft 30. Shaft 30 is connected to drive carrier 31 of the propulsion drive planetary gearing 20 which may also be called speed differential gearing. Pinions 32 supported on carrier 31 mesh with a sun gear 34 and a ring gear 36. The sun gear 34 is connected by a shaft 37 to bevel gear 38 of the bevel gear drive arrangement 24. Bevel gear 38 meshes with a bevel gear 39 connected to transmission output shaft 12. The ring gear 36 is connected by a drum 41 to a sleeve shaft 42 through which the shaft 37 extends. Sleeve shaft 42 is connected to a bevel gear 44 which meshes with a bevel gear 45 that is connected to output shaft 14.

Describing the operation of the propulsion portion of the transmission, whenever the variable speed ratio range unit 16 effects power transmittal from the input shaft 10 to the shaft 30, the thus powered carrier 31 effects drive of both the sun gear 34 and ring gear 36. The sun gear 34 and ring gear 36 turn in the same direction as the driving carrier 31 with the sun gear rotating faster than the ring gear, the speed ratio between carrier 31 and ring gear 36 being different than that between carrier 31 and sun gear 34. The speed ratios of the separate bevel gear drives 38–39 and 44–45 are made inversely proportional to the unequal output drives they receive from the propulsion drive planetary gearing 20 so that there is effected equal speed ratio drives between the input to the propulsion drive planetary gearing 20 and the transmission output shafts 12 and 14. Thus, the transmission output shafts 12 and 14 are driven at the same speed and in the same direction to provide straight vehicle drive with the direction and speed range being determined by range unit 16. Brakes 48 and 49 which may be of any suitable conventional type are connected to the respective transmission output shafts 12 and 14 for selectively braking the output shafts and thus the vehicle.

Referring to the steer portion of the transmission arrangement, the input shaft 10 is connected to a spur gear 50 which meshes with an idler gear 51. Idler gear 51 meshes with a spur gear 52 which is connected to a shaft 54. Shaft 54 is connected to drive pump 26 of the hydrostatic drive unit 18. The motor 28 of the hydrostatic drive unit is connected to a shaft 56 which is connected to a ring gear 57 of the steer drive planetary gearing 22 which may also be called speed differential gearing. Pinions 58 supported on a carrier 59 mesh with ring gear 57 and also mesh with a sun gear 61. The steer drive planetary gearing 22 has two drive connections with the propulsion drive planetary gearing 20. One of these drive connections is provided by the carrier 59 being connected to a spur gear 62 which meshes with a spur gear 63 that is connected to carrier 31 of the propulsion drive planetary gearing 20. The other drive connection is provided by the sun gear 61 being connected by shaft 66 to a spur gear 67 that meshes with a spur gear 68 which is connected by drum 41 to ring gear 36 of the propulsion drive planetary gearing 20.

In all of the propulsion drives previously described, the carrier 31 and ring gear 36 of the propulsion drive planetary gearing 20 rotate in the same direction and these members operate to drive the carrier 59 and sun gear 61, respectively, of the steer drive propulsion planetary gearing 22. Thus, the carrier 59 is driven in the same direction as sun gear 61 and therefore their speed components are subtractive in delivering any drive to ring gear 57. The speed ratios of the gear trains 62–63 and 67–68 are determined so that during all of the propulsion drives previously described, the speed of sun gear 61 is sufficiently faster than that of carrier 59 so that the net effect of the rotating sun gear 61 and carrier 59 is to establish a zero speed component to ring gear 57 so that ring gear 57 and thus motor output shaft 56 is at zero speed or stationary during all of the propulsion drives.

For steering, the hydrostatic drive unit 18 is operated by increasing the displacement of pump 26 from its normal zero displacement condition to a displacement which causes motor 28 to power the motor output shaft 56 in a direction to produce the desired direction of vehicle turning. This vehicle-turning operation is effected by the hydrostatic drive unit 18 operating on the steer drive planetary gearing 22 so that this gearing applies a speed differential bias to the propulsion drive planetary gearing 20. For example, when the hydrostatic drive unit 18 is operated to drive the motor output shaft 56 and thus ring gear 57 of the steer drive planetary gearing 22 in the same direction that the carrier 59 and sun gear 61 are rotating, the speed of sun gear 61 decreases. Assuming there is no change in the output speed of the range unit 16, the speed of carrier 59 does not change because of the fixed speed ratio between the carriers 31 and 59 provided by gears 62 and 63. Thus in the propulsion drive planetary gearing 20, the speed of carrier 31 is unchanged but that of ring gear 36 is decreased by the reduction in speed of sun gear 61 which is geared thereto. The forced decrease in the speed of ring gear 36 causes a proportional increase in the speed of sun gear 34 resulting in the speed of output shaft 12 being increased while that of output shaft 14 is decreased by the same amount with the speed differential between the two transmission output shafts proportional to the output speed of the hydrostatic motor 28. This speed differential between the output shafts 12 and 14 produces steering of the vehicle in one direction. To steer the vehicle in the opposite direction, the hydrostatic drive unit 18 is operated to drive the motor output shaft 56 in the opposite direction.

To obtain steering in neutral which occurs when there is no drive through the range unit 16, there is provided a brake 70 which, when engaged, brakes the shaft 30 and connected carrier 31 of the propulsion drive planetary gearing 20 and thus also brakes the carrier 59 of the steer drive planetary gearing 22. With brake 70 engaged and on operation of the hydrostatic drive unit 18 to drive the motor output shaft 56 in either direction, the sun gear 61 drives the ring gear 36 of the propulsion drive planetary gearing 20 with carrier 59 providing the reaction. The ring gear 36 through the medium of pinions 32 drives the sun gear 34 in the opposite direction with carrier 31 providing the reaction. With the ring gear 36 and sun gear 34 being driven in opposite directions, the transmission output shafts 12 and 14 are driven in opposite directions and at the same speed because of the offsetting speed ratios of the bevel gear drives to provide what is commonly termed pivot steering.

It will thus be appreciated that the hydrostatic drive unit 18 is used only for steering. Thus, the hydrostatic unit 18 with the pump 26 at zero displacement need not be controlled during straight vehicle operation.

The above described preferred embodiment is illustrative of the invention which may be modified within the scope of the appended claims.

We claim:

1. In a transmission the combination of an input shaft a pair of output shafts, variable speed ratio drive means drivingly connected to said input shaft, drive means including first speed differential drive means for providing separate drives from said variable speed ratio drive means to said output shafts wherein the speed ratio between the drives to said output shafts is normally constant to effect driving of said output shafts at the same speed, variable speed ratio hydrostatic drive means having an input member drivingly connected to said input shaft and also having a variable speed output member, second speed differential drive means drivingly connected to said variable speed output member and said first speed differential drive means for varying the speed ratio between the drives to said output shafts with the speed of said variable speed output member to effect a speed differential between said output shafts varying with the speed of said variable speed output member and also for maintaining said variable speed output member at zero speed when the speed ratio between the drives to said output shafts is constant, each of said first and second speed differential drive means including a sun gear member, a ring gear member and a carrier member having a pinion meshing with said sun gear member and said ring gear member, one member of said first speed differential drive means connected to be driven by said variable speed ratio drive means, first drive means drivingly connecting another member of said first speed differential drive means to one of said output shafts, second drive means drivingly connecting the third member of said first speed differential drive means to the other said output shaft, said first drive means having a speed ratio that is the inverse of that between said one member and said other member of said first speed differential drive means, said second drive means having a speed ratio that is the inverse of that between said one member and said third member of said first speed differential drive means, one member of said second speed differential drive means drivingly connected to said variable speed output member, third drive means drivingly connecting another member of said second speed differential drive means to said one member of said first speed differential drive means, fourth drive means drivingly connecting the third member of said second speed differential drive means to said other member of said first speed differential drive means, said third and fourth drive means having speed ratios providing speed components to said other member and said third member of said second speed differential drive means so that said one member of said second speed differential drive means is stationary when said variable speed output member is not being driven by said variable speed ratio hydrostatic drive means.

2. In a transmission the combination of an input shaft, a pair of output shafts, variable speed ratio drive means drivingly connected to said input shaft, drive means including first speed differential drive means for providing separate drives from said variable speed ratio drive means to said output shafts wherein the speed ratio between the drives to said output shafts is normally constant to effect driving of said output shafts at the same speed, variable speed ratio hydrostatic drive means having an input member drivingly connected to said input shaft and also having a variable speed output member, second speed differential drive means drivingly connected to said variable speed output member and said first speed differential drive means for varying the speed ratio between the drives to said output shafts with the speed of said variable speed output member to effect a speed differential between said output shafts varying with the speed of said variable speed output member and also for maintaining said variable speed output member at zero speed when the speed ratio between the drives to said output shafts is constant, each of said first and second speed differential drive means including a sun gear member, a ring gear member and a carrier member having a pinion meshing with said sun gear member and said ring gear member, one member of said first speed differential drive means connected to be driven by said variable speed ratio drive means, first drive means drivingly connecting another member of said first speed differential drive means to one of said output shafts, second drive means drivingly connecting the third member of said first speed differential drive means to the other said output shaft, said first drive means having a speed ratio that is the inverse of that between said one member and said other member of said first speed differential drive means, said second drive means having a speed ratio that is the inverse of that between said one member and said third member of said first speed differential drive means, one member of said second speed differential drive means drivingly connected to said variable speed output member, third drive means drivingly connecting another member of said second speed differential drive means to said one member of said first speed differential drive means, fourth drive means drivingly connecting the third member of said second speed differential drive means to said other member of said first speed differential drive means, said third and fourth drive means having speed ratios providing speed components to said other member and said third member of said second differential drive means so that said one member of said second speed differential drive means is stationary when said variable speed output member is not being driven by said variable speed ratio hydrostatic drive means, and a brake for braking said one member of said first speed differential drive means and said another member of said second speed differential drive means so that said variable speed ratio hydrostatic drive means is operable to drive said output shafts in opposite directions at the same speed when said variable speed ratio drive means is not transmitting drive.

3. In a transmission the combination of an input shaft, a pair of output shafts, variable speed ratio drive means drivingly connected to said input shaft, drive means including first speed differential drive means for providing separate drives from said variable speed ratio drive means to said output shafts wherein the speed ratio between the drives to said output shafts is normally constant to effect driving of said output shafts at the same speed, variable speed ratio hydrostatic drive means having an input member drivingly connected to said input shaft and also having a variable speed output member, second speed differential drive means drivingly connected to said variable speed output member and said first speed differential drive means for varying the speed ratio between the drives to said output shafts with the speed of said variable speed output member to effect a speed differential between said output shafts varying with the speed of said variable speed output member and also for maintaining said variable speed output member at zero speed when the speed ratio between the drives to said output shafts is constant, and said first speed differential drive means comprising planetary gearing having a sun gear, a ring gear and a carrier supporting a pinion meshing with said sun gear and said ring gear, said carrier connected to be driven by said variable speed ratio drive means, first drive means drivingly connecting said sun gear to one of said output shafts, second drive means drivingly connecting said ring gear to the other said output shaft, said first drive means having a speed ratio that is the inverse of that between said carrier and said sun gear, said second drive means having a speed ratio that is the inverse of that between said carrier and said ring gear.

4. In a transmission the combination of an input shaft, a pair of output shafts, variable speed ratio drive means drivingly connected to said input shaft, drive means including first speed differential drive means for providing separate drives from said variable speed ratio drive means to said output shafts wherein the speed ratio between the drives to said output shafts is normally constant to effect driving of said output shafts at the same speed, variable speed ratio hydrostatic drive means having an input member drivingly connected to said input shaft and also having a variable speed output member, second speed differential drive means drivingly connected to said variable speed output member and said first speed differential drive means for varying the speed ratio between the drives to said output shafts with the speed of said variable speed output member to effect a speed differential between said output shafts varying with the speed of said variable speed output member and also for maintaining said variable speed output member at zero speed when the speed ratio between the drives to said output shafts is constant, said first speed differential drive means comprising planetary gearing having a sun gear, a ring gear and a carrier supporting a pinion meshing with said sun gear and said ring gear, said carrier connected to be driven by said variable speed ratio drive means, first drive means drivingly connecting said sun gear to one of said output shafts, second drive means drivingly connecting said ring gear to the other said output shaft, said first drive means having a speed ratio that is the inverse of that between said carrier and said sun gear, said second drive means having a speed ratio that is the inverse of that between said carrier and said ring gear, and said second speed differential drive means comprises planetary gearing having a sun gear, a ring gear and a carrier supporting a pinion meshing with said sun gear and said ring gear, said ring gear drivingly connected to said variable speed output member, third drive means drivingly connecting said carrier of said second speed differential drive means to said carrier of said first speed differential drive means, fourth drive means drivingly connecting said sun gear of said second speed differential drive means to said ring gear of said first speed differential drive means, said third and fourth drive means having speed ratios providing speed components to said carrier and said sun gear of said second speed differential drive means so that said ring gear of said second speed differential drive means is stationary when said variable speed ratio hydrostatic drive means is not driving said variable speed output member.